US009467919B2

(12) United States Patent
Yerrabommanahalli et al.

(10) Patent No.: US 9,467,919 B2
(45) Date of Patent: Oct. 11, 2016

(54) METHODS AND APPARATUS FOR RADIO LINK IMBALANCE COMPENSATION

(71) Applicant: Apple Inc., Cupertino, CA (US)

(72) Inventors: Vikram Bhaskara Yerrabommanahalli, Sunnyvale, CA (US); Prashant H. Vashi, Sunnyvale, CA (US); Abdul-Munem Al-Khudairi, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/966,621

(22) Filed: Aug. 14, 2013

(65) Prior Publication Data

US 2014/0051449 A1     Feb. 20, 2014

Related U.S. Application Data

(60) Provisional application No. 61/683,143, filed on Aug. 14, 2012.

(51) Int. Cl.
*H04W 36/30*     (2009.01)

(52) U.S. Cl.
CPC .................... *H04W 36/30* (2013.01)

(58) Field of Classification Search
CPC .......... H04W 36/00; H04W 36/0005; H04W 36/0083–36/0094; H04W 36/04; H04W 36/06; H04W 36/08; H04W 36/10; H04W 36/16; H04W 36/24–36/30; H04W 52/146; H04W 52/228; H04B 17/0077; H04B 1/3838
USPC ........................................ 370/331, 332, 333
See application file for complete search history.

(56) References Cited

U.S. PATENT DOCUMENTS 4,696,027 A * 9/1987 Bonta ........................... 455/436
6,363,260 B1   3/2002 Achour et al.
(Continued)

FOREIGN PATENT DOCUMENTS

CN    102625389    8/2012
EP      1653673    12/2009
(Continued)

OTHER PUBLICATIONS

International Search Report and Written Opinion for PCT application No. PCT/US2013/054831, dated Nov. 27, 2013.
(Continued)

*Primary Examiner* — George Eng
*Assistant Examiner* — Umair Ahsan
(74) *Attorney, Agent, or Firm* — Downey Brand LLP

(57) ABSTRACT

Methods, apparatuses and computer readable media are described to compensate for radio frequency link imbalances in a wireless communication device. Processing circuitry in the wireless communication device detects a radio frequency link imbalance for a bi-directional communication link. The wireless communication device biases one or more operational parameters of the wireless communication device to adjust for a performance degradation induced by the radio frequency link imbalance. The wireless communication device determines whether a trigger condition for cell selection, reselection, or handover occurs based on the biased operational parameters, and when the trigger condition occurs, performs a remediating action to compensate for the radio frequency link imbalance. Remediation can include performing an intra-RAT or inter-RAT reselection or handover.

20 Claims, 9 Drawing Sheets

(56) References Cited

U.S. PATENT DOCUMENTS

| | | | |
|---|---|---|---|
| 6,434,130 B1* | 8/2002 | Soininen et al. | 370/331 |
| 7,248,889 B2 | 7/2007 | Schwarz et al. | |
| 7,933,604 B1* | 4/2011 | Rai et al. | 455/442 |
| 2002/0102977 A1* | 8/2002 | Shi | 455/437 |
| 2004/0202242 A1* | 10/2004 | Lin et al. | 375/227 |
| 2006/0105796 A1 | 5/2006 | Malladi et al. | |
| 2009/0264128 A1* | 10/2009 | Tomisawa | 455/436 |
| 2011/0105121 A1 | 5/2011 | Kazmi et al. | |
| 2011/0312327 A1* | 12/2011 | Kubota | 455/436 |
| 2012/0044818 A1 | 2/2012 | Lindoff et al. | |
| 2012/0071195 A1* | 3/2012 | Chakraborty et al. | 455/522 |
| 2013/0017805 A1* | 1/2013 | Andre-Jonsson et al. | 455/411 |
| 2013/0143572 A1* | 6/2013 | Kang et al. | 455/437 |
| 2013/0183976 A1 | 7/2013 | Zhuang et al. | |
| 2013/0252614 A1* | 9/2013 | Hsu et al. | 455/437 |
| 2013/0336288 A1* | 12/2013 | Tu | 370/331 |
| 2014/0064253 A1* | 3/2014 | Deivasigamani et al. | 370/332 |

FOREIGN PATENT DOCUMENTS

| | | |
|---|---|---|
| TW | 201220875 | 5/2012 |
| WO | 03096598 | 11/2003 |
| WO | 2008100954 | 8/2008 |
| WO | 2012172397 | 12/2012 |

OTHER PUBLICATIONS

Taiwanese Patent Application No. 102129179—Office Action dated Jun. 2, 2015.

* cited by examiner

METHODS AND APPARATUS FOR RADIO LINK IMBALANCE COMPENSATION

CROSS-REFERENCE TO RELATED APPLICATIONS

This application claims the benefit of U.S. Provisional Application No. 61/683,143, filed Aug. 14, 2012 and entitled "METHODS AND APPARATUS FOR RADIO LINK IMBALANCE COMPENSATION", which is incorporated by reference herein in its entirety for all purposes.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The described embodiments generally relate to the field of mobile technology and wireless communications. More particularly, the present embodiments describe compensation for radio link imbalances detected by wireless communication devices.

BACKGROUND

Wireless networks are based on transmission and reception of Radio Frequency (RF) electro-magnetic waves between at least two devices. During operation, the RF connection will experience a wide range of attenuations due to e.g., atmospheric effects, intervening obstacles, etc. Generally, it is assumed that the radio link between two devices is substantially symmetric; i.e., transmit and receive RF links for a given device are substantially similar in performance and attenuation. In symmetric link operation, each device assumes that their perceived performance is representative of a peer device's perceived performance at the other end of an RF link.

However, empirical evidence suggests that certain device usage scenarios can create asymmetric attenuation in each direction of an RF link, e.g. in transmit and receive RF links for a given device. For example, a user operating a wireless communication device (such as e.g., the iPad™ developed and manufactured by the Assignee hereof) in communication with a nearby Long Term Evolution (LTE) cellular network can experience a wide range of radio link performance based on e.g., the positioning of the wireless communication device with respect to the user's body. Specifically, the wireless communication device's RF transceiver may be configured to limit transmit power when the transmitter is next to the user's body (or adjacent to another object). The degree of transmit power reduction or attenuation at the wireless communication device can be based on, in one case, regulatory concerns, which can dictate Specific Absorption Rate (SAR) requirements permitted for emitted RF energy by the wireless communication device.

In the foregoing scenario, only the transmit link may be affected by the regulatory provisions, which can limit operating conditions and therefore influence performance; the receive link can remain fully operational. In some situations, the wireless communication device may not be able to successfully interact with a wireless network because its transmit power may be limited, and transmissions may be necessary to establish and/or to maintain an RF link with the wireless network, (i.e., the wireless communication device can be unable to set up the link by only receiving commands or data from a wireless network.) To make matters worse, since reception quality at the wireless communication device can be acceptable in this scenario, the wireless communication device may be unable to attempt to invoke remedial or corrective action; e.g., execute a handover to another LTE evolved NodeB (eNB), perform a cell selection/reselection, etc. Existing wireless communication devices may therefore be caught in a marginal and/or unusable operational state, thereby degrading performance and user experience.

Accordingly, improved methods and apparatus are needed for handling radio link imbalances such as for example those described in the foregoing scenario.

SUMMARY OF THE DESCRIBED EMBODIMENTS

The present described embodiments provide, inter alia, for improved apparatus and methods to compensate for radio link imbalances at a wireless communication device and/or at a network entity.

In a first aspect, a method of operating a wireless communication device is disclosed. In one embodiment, the method includes detecting a radio link imbalance; adjusting one or more trigger conditions configured to trigger a remedial action; and implementing the identified remedial action to correct or compensate for the link imbalance when the one or more trigger conditions are satisfied.

In a second aspect, a wireless communication device having radio link imbalance management capability is disclosed. In one embodiment, the wireless communication device comprises a user equipment (UE) capable of operation within a cellular (e.g., LTE) network, and comprises logic configured to adaptively adjust radio transceiver operation during link imbalance conditions so as to ameliorate or mitigate effects of a radio link imbalance on device performance. The UE may be for example a smartphone or a wireless-enabled tablet computer.

In a third aspect, a computer readable apparatus is disclosed. In one embodiment, the apparatus comprises a storage medium having at least one computer program disposed thereon, the at least one program being configured to, when executed by one or more processors, cause the apparatus to implement radio link imbalance detection and mitigation logic. In one variant, this logic is adaptively implemented such that the apparatus "learns" from prior radio link imbalance conditions.

In a fourth aspect, an integrated circuit (IC) is disclosed. In one embodiment, the integrated circuit comprises logic which is configured to implement radio link imbalance detection and mitigation logic. In one variant, the IC is a SoC (system-on-chip) device having one or more processor cores, memory, and a variety of other processing and interface functions.

In a fifth aspect, a wireless system is disclosed. In one embodiment, the system includes at least one base station and at least one wireless communication device. The wireless communication device is configured to detect and compensate for radio link imbalances between the base station and the wireless communication device. In one variant, the wireless communication device is configured to perform such detection and compensation autonomously. In other variants, the wireless communication device coordinates with the base station to compensate for or to remove a radio link imbalance. In yet other variants, the wireless communication device receives data from a peer wireless communication device (or from a network entity) in order to enable the wireless communication device to properly compensate for the radio link imbalance.

In a sixth aspect, a method of maintaining wireless communication device communication continuity is disclosed. In one embodiment, the method includes evaluating whether a link imbalance is created (thereby potentially resulting in a discontinuous transmission and/or a discontinuous reception situation), and taking remedial action to improve wireless communication device performance. In one variant, the remedial action includes adjusting one or more parameters of the wireless communication device's transceiver, e.g., increasing and/or decreasing one or more threshold values. In another variant, the remedial action includes switching between wireless base stations, e.g., by cell selection, reselection or handover, or switching between different wireless networks that use different radio access technologies (e.g., an inter-radio access technology reselection or handover, such as from an LTE wireless network to a Third Generation (3G) wireless network.)

Other features and advantages will immediately be recognized by persons of ordinary skill in the art with reference to the attached drawings and detailed description of exemplary embodiments as given below.

The above summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings, which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

DETAILED DESCRIPTION OF SELECTED EMBODIMENTS

In one aspect, the present paper discloses methods and apparatus for identifying and addressing radio link imbalances in wireless communication devices such as mobile tablet computers, smart phones, and the like.

In one embodiment, a wireless communication device uses a trigger condition (e.g., indigenous sensing such as via a proximity sensor or other sensor, or by determining a degradation of one or more link metrics) to detect the existence of a radio link imbalance that affects one or more of its radio frequency wireless interfaces. It is appreciated that while a radio link imbalance may exist, the performance degradation induced by the link imbalance may not be severe enough to affect certain device operations. Accordingly, depending on the severity of the asymmetry or imbalance, one or more remedial or corrective actions can be implemented by the wireless communication device, including for example forcing cell reselection or handover, changing among different wireless networks, changing one or more radio link parameters (such as a coding scheme, a modulation type, or a combination of these) in order to address and mitigate the radio link imbalance.

In other implementations, the wireless communication device uses externally obtained information (e.g., that from a peer wireless communication device, or from a network entity such as a base station) to identify the existence of a radio link imbalance, which can then be used to selectively trigger one or more remedial actions by the wireless communication device and/or by a network entity and/or by a peer wireless communication device (e.g., such as where two entities coordinate to change the radio link or one or more parameters associated therewith).

Exemplary embodiments are now described in detail. While these embodiments are primarily discussed in the context of wireless communication devices that can experience asymmetric radio link conditions according to the discussed usage scenarios, the present embodiments are in no way limited to such devices or such scenarios. The various aspects of the present embodiments disclosed herein may in fact be implemented to compensate for an asymmetric radio link condition in a broad range of wireless-enabled devices.

Figure 1:
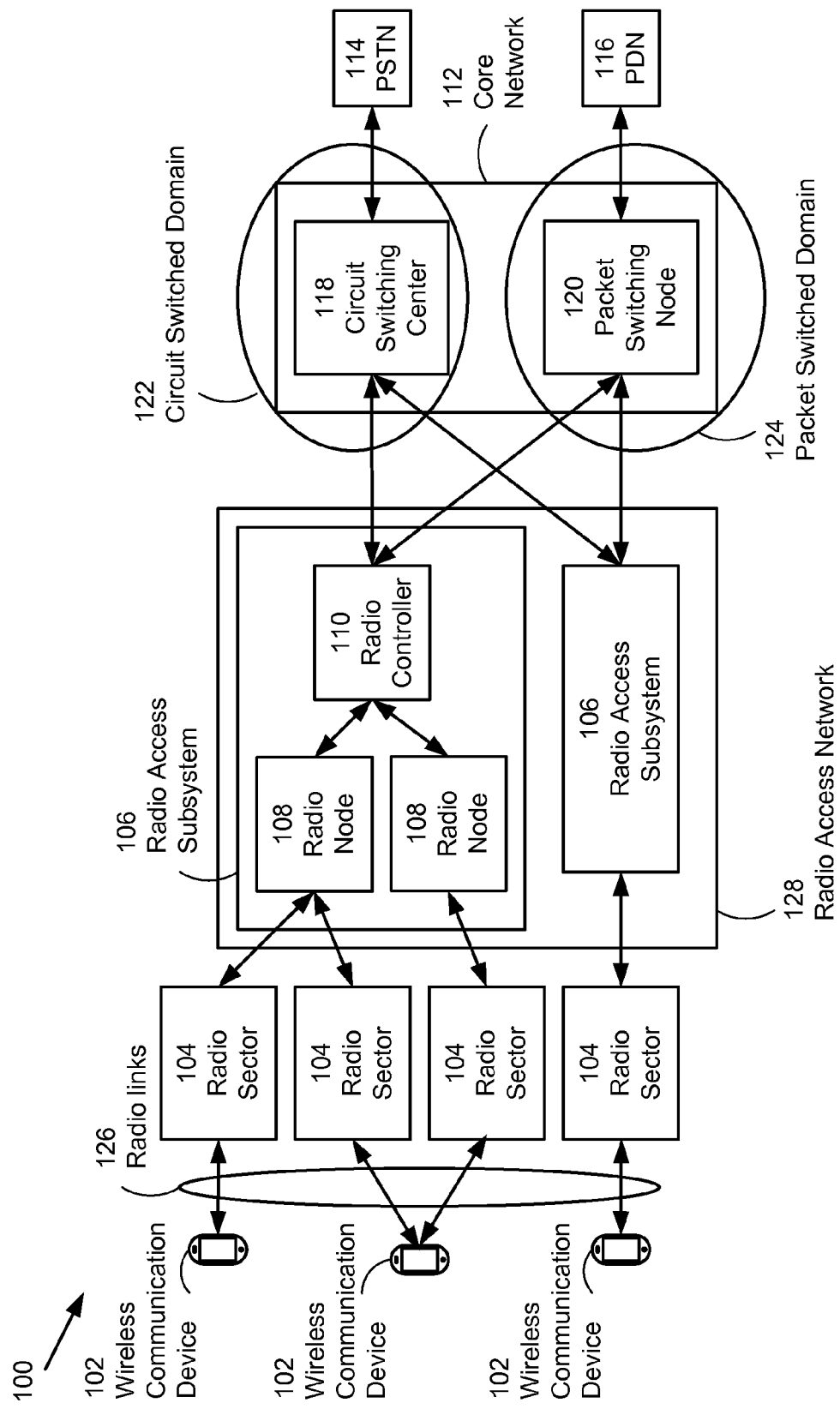
FIG. 1 illustrates components of a generic wireless communication network in accordance with some embodiments.

FIG. 1 illustrates a representative generic wireless network 100 that can include multiple wireless communication devices 102 connected by radio links 126 to radio sectors 104 provided by a radio access network 128. (Radio sectors 104 can also be referred to as cells in some embodiments.) Each radio sector 104 can represent a geographic area of radio coverage emanating from an associated radio node 108 using a radio frequency channel operating at a selected frequency. Each radio node 108 can generate one or more radio sectors 104 to which the wireless communication device 102 can connect by one or more radio links 126. In some wireless networks 100, the wireless communication device 102 can be connected to more than one radio sector 104 simultaneously. The multiple radio sectors 104 to which the wireless communication device 102 can be connected can emanate from a single radio node 108 or from separate radio nodes 108 that can share a common radio controller 110. A group of radio nodes 108 together with the associated radio controller 110 can be referred to as a radio access subsystem 106. Typically each radio node 108 in a radio access subsystem 106 can include a set of radio frequency transmitting and receiving equipment mounted on an antenna tower, and the radio controller 110 connected to the radio nodes 108 can include electronic equipment for controlling and processing transmitted and received radio frequency signals. The radio controller 110 can manage the establishment, maintenance and release of the radio links 126 that connect the wireless communication device 102 to the radio access network 128. The wireless communication device 102 can be connected to the radio access network 128 by one or more radio links 126 that can provide bi-directional communication between the wireless communication device 102 and the radio access network 128. The bi-directional communication radio links 126 can include a downlink direction from the radio access network 128 to the wireless communication device 102 and an uplink direction from the wireless communication device 102 to the radio access network 128. The distance of the wireless communication device 102 to the portion of the radio access network 128 to which the wireless communication device 102 connects can vary over time; thus characteristics of a bi-directional communication radio link 128 can be monitored and/or estimated by the wireless communication device 102 and/or by the radio access subsystem 106 of the radio access network 128. Attenuation of signals transmitted in the uplink direction and received in the downlink direction can traverse approximately the same distance, and thus attenuation characteristics of the bi-directional communication channel can be symmetric, at least approximately so in a typical configuration. In some instances, however, signals transmitted and/or received by the wireless communication device 102 can experience a different amount of attenuation in the uplink and downlink directions, e.g., when one or more transmitters and/or receivers are selectively blocked and/or signal strengths adjusted asymmetrically. In addition, levels of radio frequency noise and multi-path interference can vary in the uplink and downlink directions, thereby affecting signal performance in each direction differently. In general, a bi-directional radio link can encounter asymmetric operating conditions that can result in an imbalance of performance in one direction compared with the opposite direction of communication. In some cases, one direction can remain operational, while the opposite direction can become selectively blocked or interfered with such that performance can be unacceptable or unachievable. The embodiments described herein provide for ascertaining when an imbalance in characteristics of a bi-directional channel can potentially or actually exist and for compensating at least in part for the imbalance.

Radio resources that form the radio links 126 in the radio sectors 104 can be shared among multiple wireless communication devices 102 using a number of different multiplexing techniques, including time division, frequency division, code division, space division and combinations thereof. A radio resource control (RRC) signaling connection can be used to communicate between the wireless communication device 102 and the radio controller 110 in the radio access subsystem 106 of the radio access network 128 including requests for and dynamic allocations of radio resources to multiple wireless communication devices 102.

The radio access network 128, which provides radio frequency air link connections to the wireless communication device 102, connects also to a core network 112 that can include a circuit switched domain 122, usually used for voice traffic, and a packet switched domain 124, usually used for data traffic. Radio controllers 110 in the radio access subsystems 106 of the radio access network 128 can connect to both a circuit switching center 118 in the circuit switched domain 122 and a packet switching node 120 in the packet switched domain of the core network 112. The circuit-switching center 118 can route circuit switched traffic, such as a voice call, to a public switched telephone network (PSTN) 114. The packet switching node 120 can route packet switched traffic, such as a "connectionless" set of data packets, to a public data network (PDN) 116.

Figure 2:
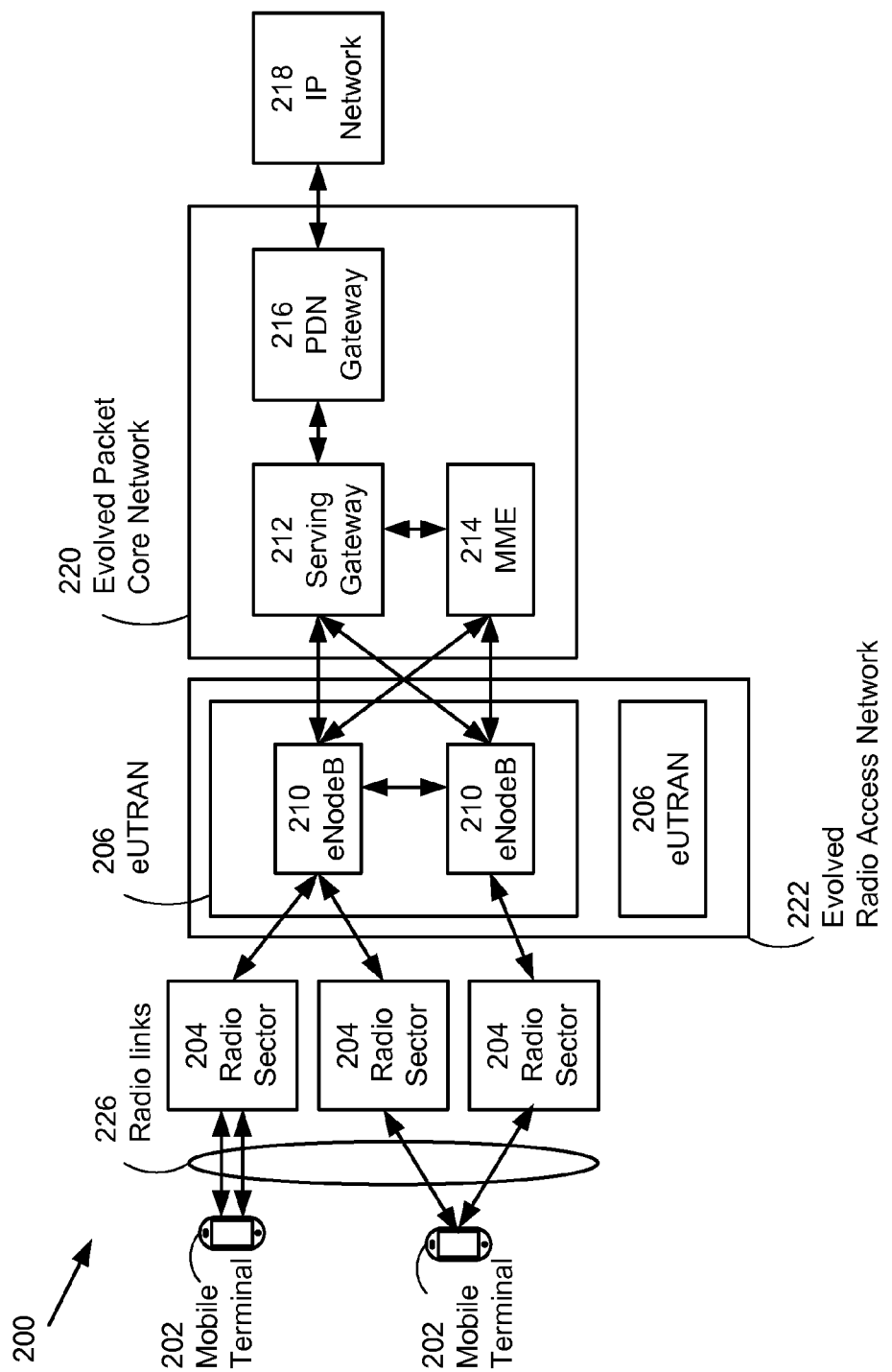
FIG. 2 illustrates components of an LTE (or LTE-Advanced) wireless communication network in accordance with some embodiments.

FIG. 2 illustrates a representative Long Term Evolution (LTE) wireless network 200 architecture designed as a packet switched network exclusively. A mobile terminal 202 can connect to an evolved radio access network 222 through radio links 226 associated with radio sectors 204 that emanate from evolved Node B's (eNodeB) 210. (In some embodiments, radio sectors 204 can be referred to as cells and mobile terminals 202 can be referred to as user equipment (UE) or as mobile wireless communication devices 102.) The eNodeB 210 can include the functions of both transmitting and receiving base stations (such as the radio node 108 in the generic wireless network 100) as well as base station radio controllers (such as the radio controller 110 in the generic wireless network 100). The equivalent core network of the LTE wireless network 200 is an evolved packet core network 220 including serving gateways 212 that interconnect the evolved radio access network 222 to public data network (PDN) gateways 216 that connect to external internet protocol (IP) networks 218. Multiple eNodeB 210 can be grouped together to form an eUTRAN 206. The eNodeB 210 can also be connected to a mobility management entity (MME) 214 that can provide control over connections for the mobile terminal 202.

Figure 3:
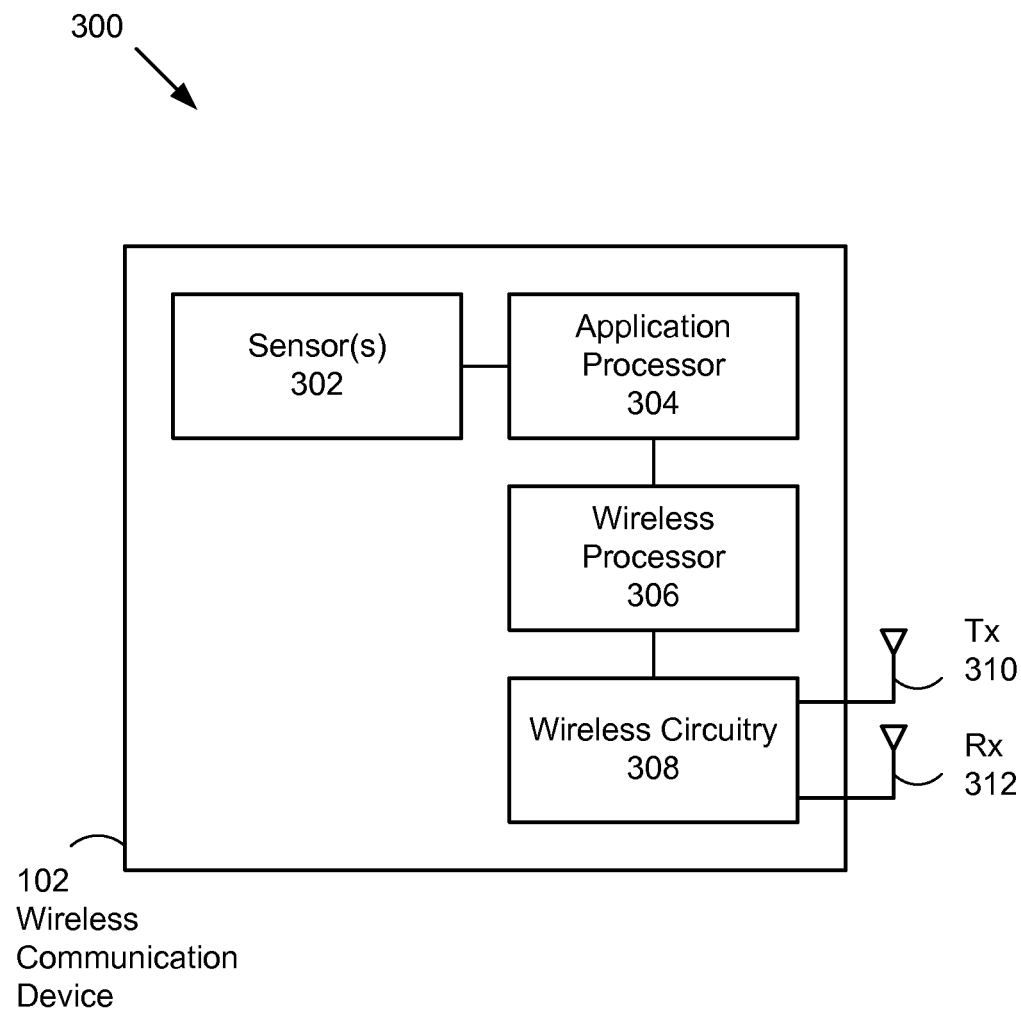
FIG. 3 illustrates components of a representative wireless communication device in accordance with some embodiments.

FIG. 3 illustrates a set of components 300 that can be contained in a wireless communication device 102 (or equivalently a mobile terminal 202). The wireless communication device 102 can include a set of sensors 302 that can monitor operating conditions of the wireless communication device 102, e.g., including the presence or absence of occluding objects adjacent to and/or in close proximity to one or more elements of the wireless circuitry 308 and/or transmit antennas 310 and/or receive antennas 312 of the wireless communication device 102. An application processor, which can provide control of a set of functions of the wireless communication device 102 can provide information obtained from various sensors 302 of the wireless communication device 102 to a wireless processor 306 (of which there can be more than one in some embodiments). The wireless processor 306 can use information provided by the application processor 304 from the sensors 302 to assist in determining when a potential or actual radio link imbalance condition can exist. The wireless processor 306 can control various aspects of operating conditions of the wireless circuitry 308 that can affect the performance of the wireless communication device 102, and in some embodiments, compensate, at least in part, for radio link imbalance conditions experienced by the wireless communication device 102.

Figure 4:
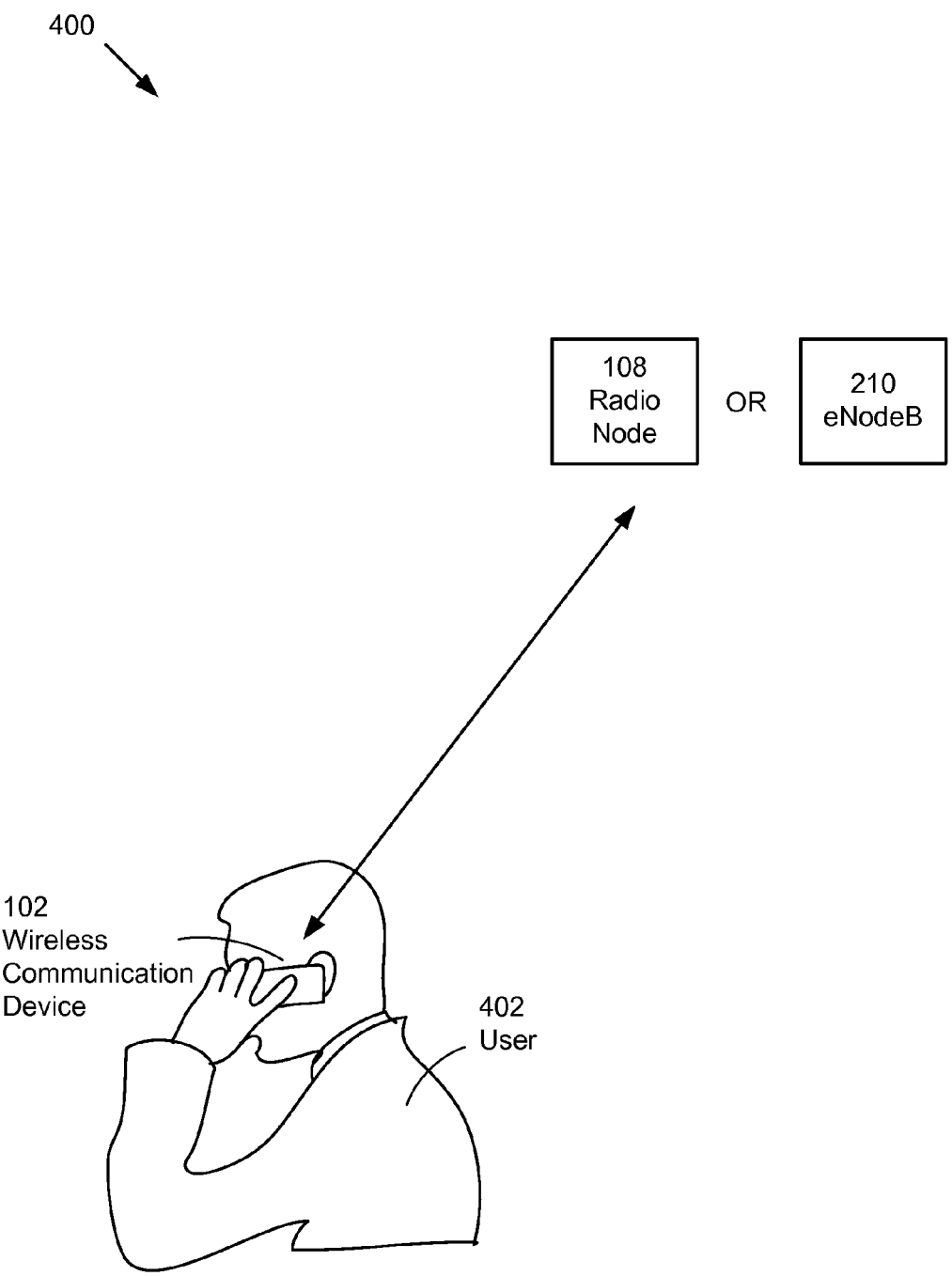
FIG. 4 illustrates an exemplary usage scenario in accordance with some embodiments.

Referring now to FIG. 4, one exemplary usage scenario 400 useful for illustrating various aspects of representative embodiments is shown. As illustrated, a user 402 operates a wireless communication device 102 in communication to a nearby radio node 108 of a wireless network 100, e.g., an eNodeB 210 of a Long Term Evolution (LTE) cellular network 200 as illustrated in FIG. 2.

As a brief aside, a cellular network operator can provide mobile telecommunications services to the public via a network infrastructure of e.g., cellular base stations (BS), base station controllers, infrastructure nodes, etc. as illustrated in FIG. 1 and FIG. 2.

There are a wide variety of cellular wireless network technologies, and historically cellular wireless devices have been specialized for operation within a single cellular wireless network. In the last few years, Long Term Evolution (LTE) has become the dominant choice for Fourth Generation (4G) cellular wireless network technologies. LTE is standardized under the Third Generation Partnership Project (3GPP); existing LTE wireless networks comply with so-called Release 8 requirements, while ongoing research has been and continues to be directed to future enhancements for subsequent releases (e.g., Release 9, Release 10, etc.).

Due to social concerns regarding radiated Radio Frequency (RF) energy in close proximity to human living tissue, current regulatory bodies (e.g., the Federal Communications Commission in the U.S. and other entities in the E.U.) have issued restrictions on certain types of RF emissions. Regulations vary between countries and over various spectral frequency bands, etc. There are many different solutions or approaches for addressing compliance with the aforementioned regulatory restrictions.

Referring back to FIG. 4, the exemplary wireless communication device 102 can include a proximity sensor (not shown) configured to detect objects in close proximity to a transmit antenna of the wireless communication device 102. If the proximity sensor detects a nearby object (which is conservatively always assumed to be a human, such as user 402), the proximity sensor responsively triggers a transmit power limitation, e.g., by adjusting an amount of transmitted radio frequency energy or by setting a maximum permitted transmit power level to moderate the amount of transmitted radio frequency energy. For example, the exemplary iPad may be capable of using up to an actual maximum transmit power of 23 dBm; however, when a proximity sensor detects a nearby object, the iPad can limit its transmit RF power to a lower level, e.g., to 18 dBm (the actual amount of transmit power reduction can be specified controlled by e.g., the relevant regulatory body and may differ in different geographic regions, when using different RF bands, or based on other criteria, 18 dBm being purely illustrative).

By limiting the transmit RF power, the wireless communication device 102 necessarily introduces an asymmetric RF link condition. To illustrate this RF link asymmetry, consider the scenario where the LTE eNodeB 210 transmits a first RF signal in a downlink direction to the wireless communication device 102 at 23 dBm, and the first signal is attenuated by the radio frequency channel linking the wireless communication device 102 to the LTE eNodeB 210 resulting in the first signal received at the wireless communication device 102 with an RF signal power level of approximately −115 dBm. If the wireless communication device 102 transmits a second RF signal at 23 dBm in an uplink direction from the mobile wireless device to the LTE eNodeB 210, then a symmetric radio frequency channel can attenuate the second RF signal by an equal amount, i.e., the LTE eNodeB can receive the second RF signal a signal power level of approximately −115 dBm as well. Within this context, if the wireless communication device 102 is limited to transmit in the uplink direction at maximum transmit power level of 18 dBm (instead of a maximum of 23 dBm) then the LTE eNodeB 210 can receive the second RF signal at a signal power level of only −120 dBm; however, the receive RF link of the wireless communication device 102 can be unaffected (i.e., the wireless communication device 102 can still receive the first RF signal at a signal power level of −115 dBm). This corresponding drop in performance for uplink signals can greatly affect the wireless communication device 102 operation, and in some cases can result in excessive Radio Link Failures (RLF), undesirable re-transmission burdens, and/or added coding complexity.

Existing LTE eNodeBs 210 can dictate wireless network conditions that are suitable for cell reselection and/or handover between cells or to other wireless radio access technology networks. For example, a service LTE eNodeB 210 of the wireless communication device 102 may indicate that handovers to another LTE eNodeB 210 or to a Third Generation (3G) base station (e.g., a Universal Mobile Telecommunication System (UMTS) NodeB (NB), etc.) should be performed when a received RF signal power level falls at or below a particular threshold level, e.g., at 120 dBm. In this scenario, since only the wireless communication device 102 transmit path has been limited in the uplink direction for signals transmitted to the LTE eNodeB 210 (and are received at the marginal −120 dBm threshold), the wireless communication device 102 receive path in the downlink direction from the LTE eNodeB 210 can remain well within network tolerances (−115 dBm). Accordingly, the wireless communication device 102 can determine to not execute a handover, cell selection, and/or cell reselection procedure. However, even a small dip in uplink RF channel quality can present significant problems for uplink transmissions from the wireless communication device 102 to the LTE eNodeB 210, e.g., due to the limited amount of transmit signal power that can result in a received RF signal at the eNodeB 210 that falls below an acceptable threshold level for proper decoding and/or link performance.

Figure 5:
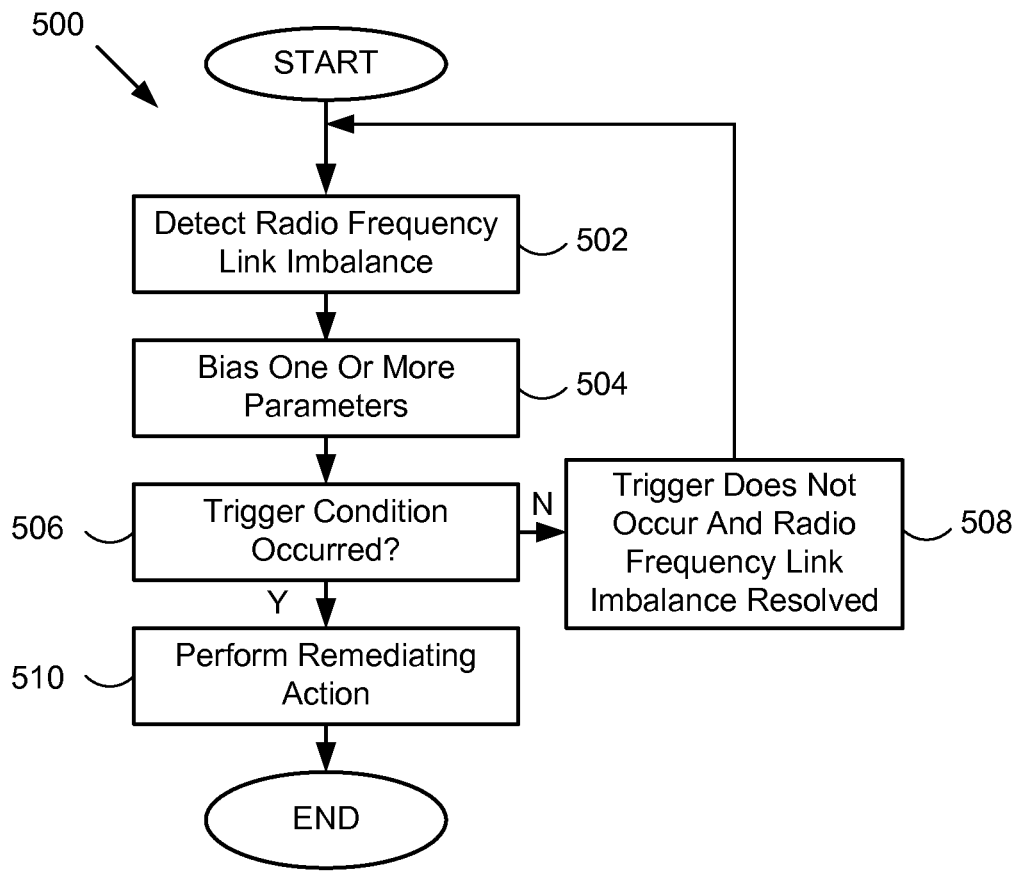
FIG. 5 illustrates a method for compensating for radio link imbalances in accordance with some embodiments.

Referring now to FIG. 5, one embodiment of a generalized method 500 for compensating for radio frequency link imbalances at a wireless communication device 102 is shown and described. In one aspect, when the wireless communication device 102 identifies a radio frequency link imbalance condition (or the existence of conditions from which a radio link imbalance condition can be inferred), the wireless communication device 102 responsively biases one or more operational parameters of the wireless communication device 102 to compensate for performance degradation caused by the radio link imbalance conditions. For example, in one exemplary implementation, when a wireless communication device 102 identifies a reduction in transmit radio frequency link performance compared to the receive radio frequency link performance, the wireless communication device 102 biases cell selection, cell reselection and/or handover trigger event thresholds so as to match the reduction in transmit radio frequency link performance, e.g., by adjusting trigger thresholds based on detection of and/or measurements of the radio frequency link imbalance. The biased thresholds can be configured such that the wireless communication device 102 can perform cell reselection (or another switching operation) before performance is significantly impacted (however, when performance remains acceptable, no action may be necessary). In other examples, when a wireless communication device 102 identifies a reduction in receive radio frequency link performance compared to its transmit radio frequency link performance, the wireless communication device 102 can adjust the transmit radio frequency link performance so as to be commensurate with the receive radio frequency link performance.

At step 502 of the method 500, a radio frequency link imbalance is detected or inferred. While various embodiments are directed to radio frequency link imbalances that can result from regulatory limitations on transmit power, e.g., restricted on emitted radio frequency energy levels, it is appreciated that radio frequency link imbalances can exist for a wide range of reasons. Another example of radio frequency link imbalance can include use scenarios where transmit and receive signal paths and/or wireless signal processing functions are distinct (e.g., spatially, temporally, spectrally, algorithmically, etc.) in the wireless communication device 102 and have unrelated (or loosely related) degrees of performance. In still other situations, the transmitter and receiver of the wireless communication device 102 may have different radio frequency power capabilities. For example, many near-field technologies are designed for asymmetric operation (i.e., one radio frequency device can have significantly more transmit power than the other radio frequency device). Hence, while various embodiments described herein refer primarily to actively generated radio frequency link imbalances (i.e., those radio frequency link imbalances that can result from an intentional act such as radio frequency transmit power reduction to comply with regulatory requirements), aspects of the described embodiments apply equally to passively occurring or induced radio frequency link imbalances; e.g., those radio frequency link imbalances that can result from the radio frequency transmission or reception environment, design asymmetries, different transmit/receive processing chains, etc.

In one exemplary embodiment, the radio frequency link imbalance detection condition may be based on the detection of an occluding or proximate object adjacent to and/or near the wireless communication device 102. In one such variant, the occluding or proximate object automatically results in a transmit power limitation for the wireless communication device 102 to satisfy regulatory requirements (e.g., SAR requirements as referenced supra). In alternate embodiments, a wireless communication device 102 may limit its transmit radio frequency power so as to reduce power consumption and/or to satisfy a set of thermal constraints. Similarly, the wireless communication device 102 may limit its transmit radio frequency power so as to reduce interference with another higher priority coexisting wireless radio frequency technology resident in the wireless communication device 102. Moreover, the reduction in transmit radio frequency power by the wireless communication device 102 may be intentional for other reasons, such as for example to limit a probability of intercept (LPI) or to reduce detection, e.g., in military or Homeland Defense applications.

In some embodiments, the radio frequency link imbalance detection condition may include one or more performance metrics. For example, in one exemplary implementation, the wireless communication device 102 monitors one or more of: (i) Radio Link Failures (RLF), (ii) Radio Link Grants (RLG), (iii) Signal to Noise Ratio, (iv) Signal to Interference plus Noise Ratio (SINR), (v) Carrier to Noise Ratio (CNR), (vi) Carrier to Interference plus Noise Ratio (CINR), (vii) Received Signal Strength Indicator (RSSI), (viii) Bit Error Rate (BER), (ix) Block Error Rate (BLER), (x) Reference Signal Received Power (RSRP), and/or (xi) Reference Signal Received Quality (RSRQ). Yet other useful metrics will be appreciated by those of ordinary skill given the present disclosure.

In some variants, the radio frequency link imbalance detection condition may be further modified according to one or more wireless network parameters. Some wireless networks broadcast parameters that may partially (or wholly) prevent radio frequency link imbalance asymmetric conditions. For example, consider a cellular wireless network that broadcasts system information blocks (SIBs) that instruct wireless communication devices 102 that a minimum level of received signal power for network operation is −110 dBm. In such a scenario, the reception path in the downlink direction from the wireless network to the wireless communication device 102 is relatively more constrained by the broadcasted wireless network parameters, than the transmission path in the uplink direction from the wireless communication device 102 to the wireless network is by any regulatory constraints. In other examples, the cellular wireless network may be configured to override, or specify appropriate remedial actions. For example, the cellular wireless network may provide specific instructions for better system reselection (BSR), identify a nearby wireless network with which to associate, cell select with, cell reselect to, execute handover to, etc. In some cases, the cellular wireless network may explicitly force the wireless communication device 102 to require cell selection/re-selection instructions from the cellular wireless network before execution (effectively overriding the BSR procedure).

In still other embodiments, the radio frequency link imbalance detection condition may include monitoring one or more metrics based at least in part on one or more aspects of a processing burden. For example, in one exemplary embodiment, the wireless communication device 102 monitors one or more of: (i) transmit power consumption, (ii) transmit processing gain, (iii) modulation complexity, (iv) Modulation and Coding Scheme (MCS), (v) receive power consumption, (vi) receive processing gain, (vii) demodulation complexity, and/or (viii) retry attempts.

At step 504 of the method 500 of FIG. 5, one or more operational parameters of the wireless communication device 102 are biased to adjust for the detected radio frequency link imbalance. In one exemplary embodiment, the wireless communication device 102 adjusts one or more operational parameters configured to trigger network selection. For example, within an LTE network, such as the LTE network 200 illustrated in FIG. 2, the wireless communication device 102 can adjust a threshold for reception signal strength used for e.g., cell selection, cell reselection, handover, etc. For instance, if the wireless communication device 102 normally performs cell selection when the received signal strength falls below −120 dBm, the wireless communication device 102 can adjust the threshold value such that cell selection occurs at a higher received signal strength (e.g., at −115 dBm or at −110 dBm.)

In one implementation, the adjustment or "bias" of the one or more operational parameters can be based on a degree of asymmetry presented by the detected radio frequency link imbalance condition. In some variants, the degree of asymmetry is known a priori by the wireless communication device 102, but alternately the degree of asymmetry may be determined (either dynamically, or from an extant source of information such as from a process or routine tasked with evaluating the asymmetry). For example, within the context of asymmetry caused by a regulatory limitation, the adjustment of bias can be inferred from a difference between a maximum transmit power possible for the radio frequency component and the maximum transmit power allowed by the regulatory limitation. For instance, if a radio frequency component of the wireless communication device 102 can maximally transmit at 23 dBm but is limited to 18 dBm for regulatory purposes, then the bias is the difference (5 dB) (it should be noted that absolute transmission power is measured in dBm (decibels referenced to 1 mW), whereas a relative difference between transmission power is specified in dB (decibels)). In this example, the wireless communication device 102 can initiate cell selection, cell reselection, or handover procedures, when its current serving cell signal strength, as measured by the wireless communication device 102, drops below a higher signal threshold (e.g., 5 dB higher than otherwise.)

It is further appreciated that various regulatory bodies may specify different tolerances and/or limitations, and even the same regulatory body may specify different levels for different use cases, for different radio frequency spectral ranges (bands), and/or for different scenarios. For example, the United States (US) has different requirements for Specific Absorption Rate (SAR) than the European Union (EU). Moreover, US SAR requirements are not uniform throughout different radio frequency spectral ranges (bands). To these ends, the wireless communication device 102 may include an internal storage device or other data repository (such as a look-up table, etc.) which is populated with corresponding requirements for one or more jurisdictions, countries, operational use cases, etc. Moreover, it is appreciated that in addition to a region of operation, various other factors may be considered including, without limitation: (i) spectral radio frequency, (ii) time of use, (iii) duration of use, (iv) total or average radio frequency power transmitted, (v) peak radio frequency power transmitted, (vi) rate of change of transmitted radio frequency power, etc.

In alternate embodiments, the adjustment or "bias" of one or more operational parameters of the wireless communication device 102 is determined dynamically. Embodiments that dynamically determine the degree of asymmetry may for example perform a relative comparison of transmit and receive performance. In one such exemplary scenario, a first wireless communication device 102 and a second wireless communication device 102 can transmit a signal that includes information about their relative received reception. Each wireless communication device 102 can determine its own receive performance, and compare self-determined receive performance to the peer wireless communication device's reported receive performance. If the two receive performances do not agree, then the wireless communication devices 102 can determine the relative disparity in performance (i.e., which wireless communication device 102 is transmitting at a lower relative radio frequency power). Obviously, the foregoing scenario can be extended to more than two peer wireless communication devices 102, such as for example where three wireless communication devices 102 compare performance metrics.

As previously described, an amount of adjustment or bias of one or more operational parameters of the wireless communication device 102 may be overridden by one or more wireless network specified parameters. For example, certain wireless network operators may configure their LTE eNodeBs 210 to transfer more or less conservatively, e.g., at different radio frequency power levels and/or require different minimum radio frequency signal strengths to determine satisfactory performance and/or operating conditions. Consider an LTE eNodeB 102 that specifies cell selection, cell reselection, or handover operations must occur at a received threshold of −110 dBm (as opposed to the −120 dBm required by a governing regulatory body). This conservative threshold may not need to be adjusted when a radio frequency link imbalance condition occurs. In fact, if the wireless communication device 102 were to bias its corresponding threshold by 5 dB, (e.g., from −110 dBm to −105 dBm), the wireless communication device 102 would perform cell selection, cell reselection, or handover much earlier than required, thereby resulting in unnecessary transfers and excessive network overhead.

At step 506 of the method 500, when one or more biased trigger conditions occur, the wireless communication device 102 can perform an appropriate remediating action. Common examples of remediating actions can include without limitation: changing associated and/or connections to another base station or wireless network, changing modulation and/or coding behavior, adjusting quality of service, etc.

For example, in one exemplary embodiment, an LTE wireless communication device 102 configures itself to perform cell selection, cell reselection, and/or handover once the received signal strength from its current LTE eNodeB 210 drops below −115 dBm (i.e., −120 dBm with an additional 5 dB bias). Specifically, once a radio frequency signal reception drops below the biased threshold, the LTE wireless communication device 102 can attempt a handover to another LTE eNodeB 210, or to establish a connection with a legacy wireless network, e.g., a wireless network that operates in accordance with a Third Generation (3G) wireless communication protocol, such as a Universal Mobile Telecommunication System (UMTS) wireless network, a Code Division Multiple Access (CDMA) 2000 wireless network, or a CDMA EVDO wireless network, etc.

At step 508 of the method 500, when one or more biased trigger conditions do not occur, and the radio frequency link imbalance condition ends (e.g., the user changes their position such that the transmit antenna is no longer occluded or proximate thereto, etc.), then the wireless communication device 102 returns to a normal operation (e.g., returns any bias conditions or changes to threshold values to their normal default settings). In alternate configurations, the return to such default conditions may progress in a step-wise or incremental fashion (e.g., as a function of time) or via a hysteresis or wait state, in the case where the occlusion or disposition of the user repeatedly transitions from the occluded/proximate state to the non-occluded/non-proximate state, thereby preventing unstable condition changes within the wireless communication device 102.

It will also be appreciated that the one or more radio frequency link imbalance detection conditions used as the basis for monitoring/detection of the radio frequency link imbalance may be "intelligently" varied as a function of time, operational conditions or state, prior experience, etc. For instance, in one variant of the method 500, the radio frequency link imbalance trigger condition(s) is/are changed for different operating conditions, each different radio frequency link imbalance trigger condition being best suited to detect the imbalance under such operating conditions/state. (For example, a trigger threshold value can be state dependent.) In another variant, the logic of the evaluating wireless communication device 102 (e.g., computer program in memory of the wireless communication device 102, as discussed below with respect to FIG. 6) is configured to evaluate one or more prior radio frequency link imbalance events actually experienced by the wireless communication device 102 (or by other wireless communication devices 102, such as via a shared database) to adapt its radio frequency link imbalance trigger conditions and/or remediation based thereon. Similarly, a "statistical" approach can be employed, such as where monitoring efforts are allocated to radio frequency link imbalance trigger conditions proportionate to the occurrence of certain types of conditions or imbalance events.

Figure 6:
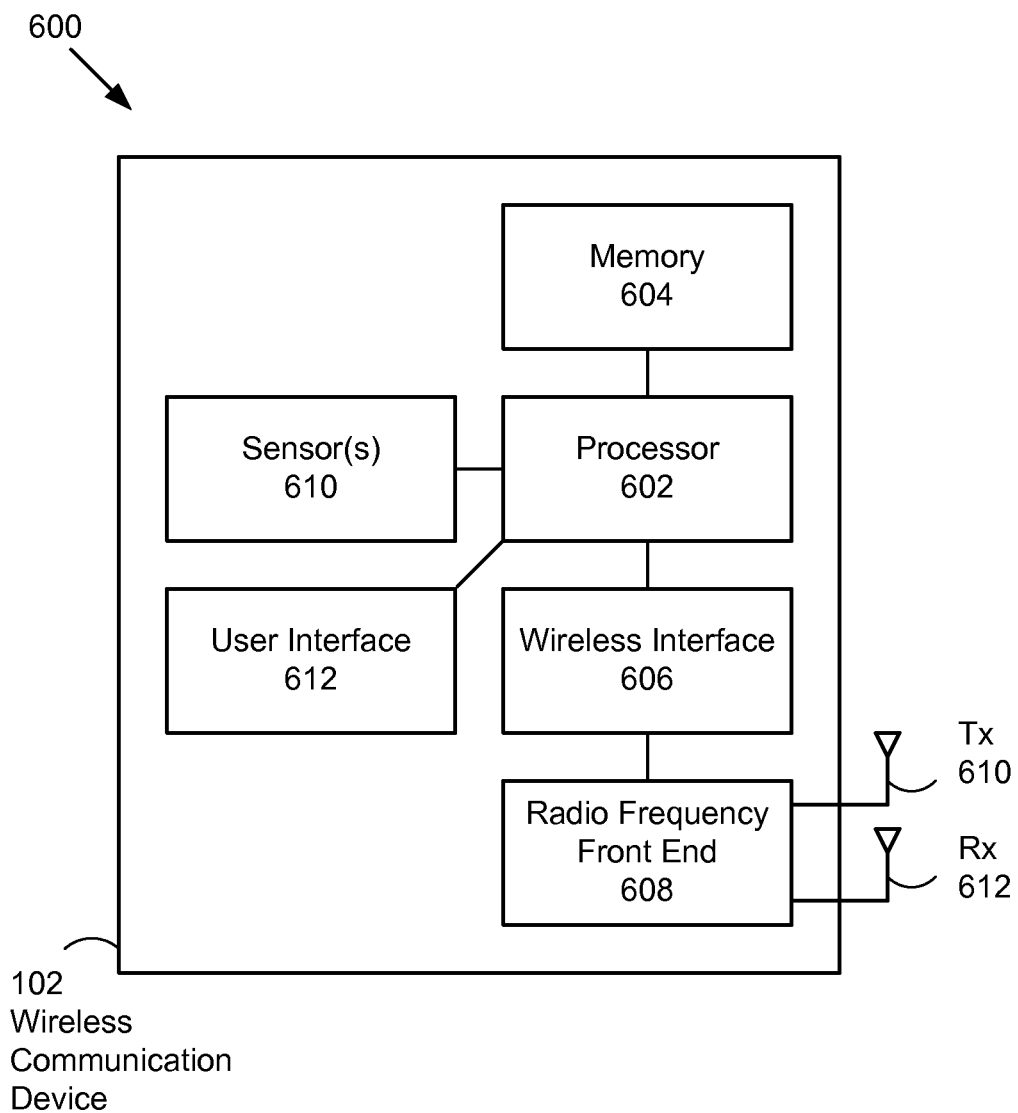
FIG. 6 illustrates components of another representative wireless communication device in accordance with some embodiments.

Referring now to FIG. 6, an exemplary set of components 600 for a wireless communication device 102 configured in accordance with some embodiments (i.e., to compensate for radio frequency link imbalances) is shown and described. As used herein, the term "wireless communication device" 102 includes, but is not limited to cellular telephones, smart phones (such as for example an iPhone™ manufactured by the Assignee hereof), handheld computers, tablet computers (such as the aforementioned iPad), personal media devices (PMDs), or any combinations of the foregoing. While a specific wireless communication device 102 configuration and layout is shown and discussed, it is recognized that many other implementations may be readily implemented by one of ordinary skill given the present disclosure, the set of components 600 of FIG. 6 being merely illustrative of the broader principles of embodiments described herein.

A processing subsystem of the wireless communication device 102, illustrated in FIG. 6 as processor 602, can include one or more of central processing units (CPU) or digital processors, such as a microprocessor, digital signal processor, field-programmable gate array, RISC core, a baseband processor, or plurality of processing components mounted on one or more substrates. In some embodiments, one or more of the above-mentioned processors (e.g. the baseband processor) is further configured to compensate for radio frequency link imbalances, as described herein. In some embodiments, the processor 602 can correspond to the application processor 304 illustrated in FIG. 3.

The processing subsystem (processor 602) can be coupled to computer-readable storage media such as memory 604, which may include for example SRAM, FLASH, SDRAM, and/or HDD (Hard Disk Drive) components. As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM. The processing subsystem may also include additional co-processors, such as a dedicated graphics accelerator, network processor (NP), or audio/video processor. As shown processing subsystem includes discrete components; however, it is understood that in some embodiments they may be consolidated or fashioned in a SoC (system-on-chip) configuration.

The set of components 600 further includes one or more wireless interfaces 606 that can be configured to transmit and receive radio frequency signals, e.g., through a radio frequency front end 608 coupled to a set of transmit antennas 610 and a set of receive antennas 612. In some embodiments, the wireless interface 606 comprises a baseband wireless processor. In some embodiments, the wireless interface 606 of FIG. 6 corresponds to the wireless processor 306 of FIG. 3. In some embodiments, the radio frequency front end 608 of FIG. 6 corresponds to the wireless circuitry 308 of FIG. 3. In some embodiments, the transmit antennas 610 and the receive antennas 612 of FIG. 6 correspond to the transmit antennas 310 and the receive antennas of FIG. 3.

The wireless communication device 102 can also include a user interface 612 (which in some embodiments can also be combined with a display device) that is in signal communication with the processing subsystem (processor 602) and with other supporting display/input drivers as necessary. In one variant, a user of the wireless communication device 102 is apprised (e.g., via the user interface 612) of the existence of an occlusion/proximity situation and/or of an RF link asymmetry (e.g., via an icon, on-screen color change, textual indication, etc.). In another variant, the user of the wireless communication device 102 is provided an ability to configure one or more remedial actions taken by the wireless communication device 102 (including e.g., the aforementioned radio frequency link imbalance triggers or thresholds) via e.g., a menu, application, etc. accessible via the user interface 612.

In some embodiments, a set of one or more sensors 610, e.g., a proximity sensor, is also included in the wireless communication device 102. In some embodiments, the set of sensors 610 corresponds to the sensor(s) 302 of FIG. 3. In certain variants, the set of sensors 610 includes an ultrasonic device, or alternatively an infrared (IR) device, although other types of sensing devices may be used with equal success. For instance, in one variant, a change in electric field or capacitance resulting from a user grasping the wireless communication device 102 in certain areas thereof (e.g., over an antenna) may be used to indicate the presence or possibility of a radio frequency link imbalance (or the need to reduce a transmit radio frequency power level for and accompanying radio frequency link.)

Figure 7:
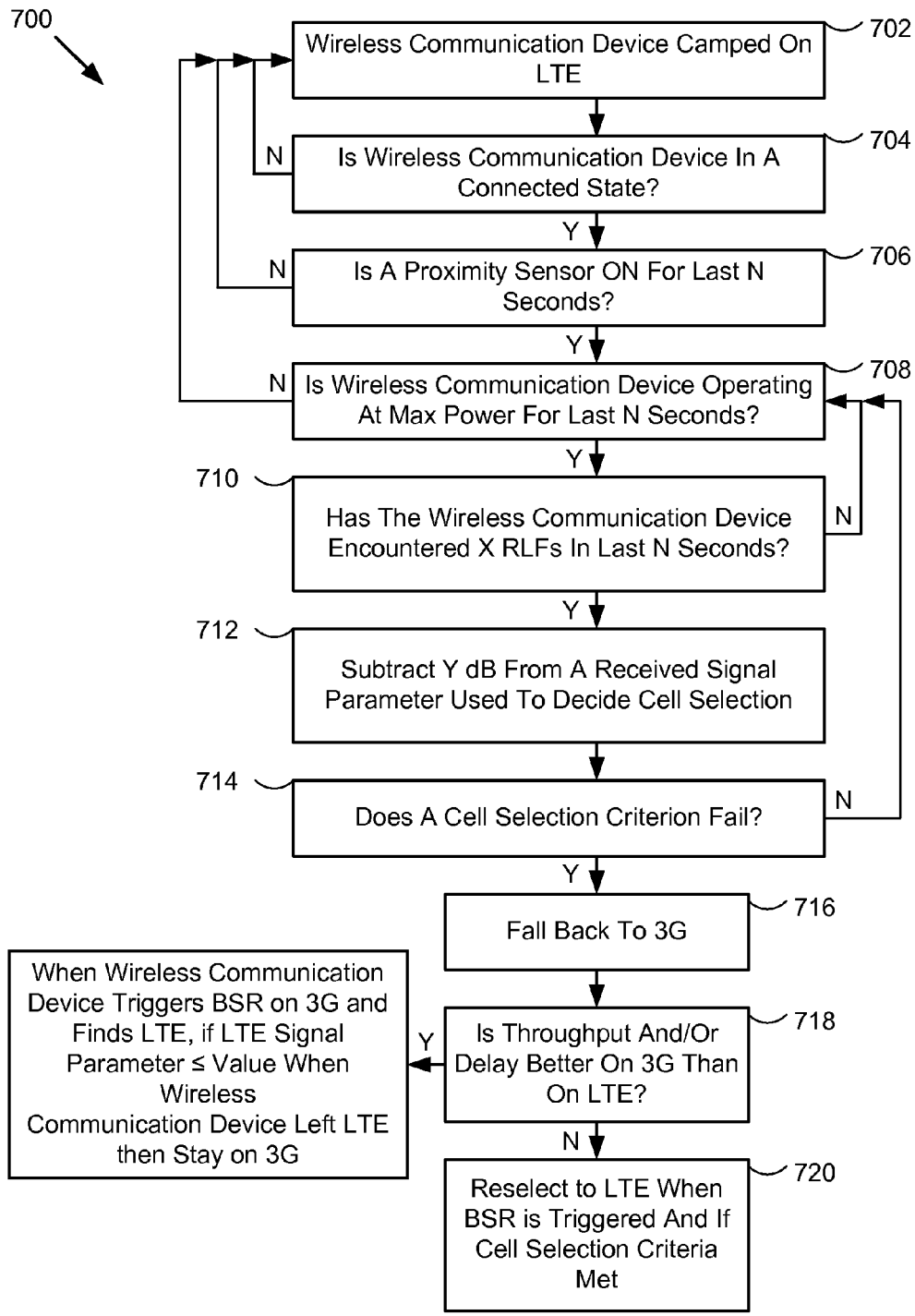
FIG. 7 illustrates another method for compensating for radio link imbalances in accordance with some embodiments.

In an exemplary embodiment, a computer-readable storage media includes a computer program with instructions which, when executed by the processor 602, causes one or more components of the mobile wireless communication device 102 to implement link imbalance detection and remediation logic, e.g., as described herein with respect to, inter alia, FIGS. 5 and 7.

FIG. 7 illustrates a logical flow diagram for a representative method 700 to compensate for radio frequency link imbalances in a wireless communication device 102. The representative method 700 is in accordance with the general method 500 illustrated in FIG. 5, in some embodiments.

At step 702 of the method 400, a Long Term Evolution (LTE) wireless communication device 102 is registered with and camped on an LTE wireless network 200. As used herein, the terms "camping", "camped", and "camp" refer without limitation to a wireless communication device 102 that has registered with a wireless network, e.g., the LTE wireless network 200 and/or the generic wireless network 100. Wireless network registration can require that the wireless communication device 102 and the wireless network have successfully negotiated various authentication, authorization, and accounting protocols.

At step 704 of the method 700, the LTE wireless communication device 102 determines whether it is in a connected state with the wireless network. As a brief aside, the LTE wireless communication device 102 can be in two different states: an RRC_CONNECTED state and an RRC_IDLE state. While in the RRC_CONNECTED state, the wireless communication device 102 can have dedicated physical radio frequency resources provided by the wireless network, and the wireless communication device 102 can monitor the wireless network for pending data transfers The wireless communication device 102, in the RRC_CONNECTED state, can also initiate data transfers to the wireless network with which it is connected. While in the RRC_IDLE state, the wireless communication device 102 does not have any dedicated physical radio frequency resources allocated to it by the wireless network, and the wireless communication device 102 must provide a request to the wireless network (and be provided a grant from the wireless network) to proceed to the RRC_CONNECTED state to transact data.

Optionally, the LTE wireless communication device 102 may receive explicit instruction from a wireless network e.g., via a System Information Block (SIB) broadcast by the wireless network, providing the cell selection, cell reselection, and/or handover criteria, which override the wireless communication device's 102 internal setting. For example, if the LTE eNodeB 210 indicates that cell selection should be performed at −110 dBm, then the wireless network setting prevails and the wireless communication device 102 does not need to continue the procedure.

Otherwise, at step 706 of the method 700, the LTE wireless communication device 102 determines whether a radio frequency link imbalance condition has occurred (e.g., a proximity sensor has registered a nearby object occluding the antenna for a minimum time interval). Current proximity solutions cannot differentiate between objects; for this reason, any proximate object is assumed to have living tissue. However, it is appreciated that future improvements to technology may yield more precise sensor types and sensor capabilities, such as via capacitance or other properties typically associated with human tissue. The selection of the time interval reduces "false alarms" e.g., proper time interval selection reduces unnecessary changes to device behavior or "dithering" for intermittent detection, or false positive matches. Unfortunately, the minimum time interval also cannot be set too long, as longer time intervals can risk excessive transmit radiation that can exceed regulatory requirements.

At step 708 of the method 700, the LTE wireless communication device 102 determines whether it has been operating at a maximum allowed radio frequency transmit power level for a minimum time interval. In one such variant, the minimum time interval is selected so as to avoid unnecessary changes to wireless communication device behavior when the wireless communication device 102 is not operating at a maximum capacity. In other words, if the wireless communication device 102 is able to operate in its current radio environment, then it is undesirable to relax network constraints, e.g., cell selection, cell reselection, handover, etc. Specifically, the wireless communication device 102 may provide better subscriber service and reduce network overhead by minimizing a number of unnecessary cell selections, cell reselections, and handovers.

If any of the conditions of steps 702, 704, 706, or 708 are not met, then the wireless communication device 102 does not change operation. Otherwise, the wireless communication device 102 proceeds to step 710, when all the conditions of steps 702, 704, 706 and 708 are met.

At step 710 of the method 700, the LTE wireless communication device 102 determines whether it has experienced more than a minimum number of Radio Link Failures (RLFs) within a designated time period. In certain variants, the number of acceptable RLFs may be based on an agreed Quality of Service (QoS) requirement. In alternate embodiments, the LTE wireless communication device 102 determines whether it has experienced fewer than a minimum number of Radio Link Grants (RLGs). In either scenario, the wireless communication device 102 seeks to ensure that its received level of service is commensurate with its requirements.

If step 710 is not met, then the wireless communication device 102 continues to monitor radio frequency link performance (steps 708, 710), otherwise the wireless communication device 102 may adjust behavior and proceed to step 712.

At step 712, the LTE wireless communication device 102 adjusts its cell reselection parameters in accordance with a value that is determined based on a radio frequency transmit power limitation. Various technologies (e.g., GSM, UMTS, 1× and EV-DO) may have specific parameters, however in the exemplary LTE embodiment, an adjustment value is determined according to TABLE 1, which is populated as shown. Each row in TABLE 1 represents a set of values for a particular LTE frequency band.

TABLE 1

| Band | MaxTxPwr (dBm) | AdjMaxTxPwr (dBm) | DwnLinkBalSigPwr (dBm) | CellSelThresh (dBm) |
|---|---|---|---|---|
| Band_A | MaxTxPwr_A | AdjMaxTxPwr_A | DwnLinkBalRxPwr_A | CellSelThresh_A |
| Band_B | MaxTxPwr_B | AdjMaxTxPwr_B | DwnLinkBalRxPwr_B | CellSelThresh_B |
| ... | | | | |

The parameter MaxTxPwr (dBm) is the maximum per band Power Amplifier (PA) Transmit (TX) power under normal conditions. The parameter AdjMaxTxPwr (dBm) is the maximum per band PA Tx backoff power in the event of object proximity (or due to thermal limits, etc.). The parameter DwnLinkBalSigPwr (dBm) is the per band downlink link balance value (typically from Link Budget calculations); and the parameter CellSelThresh (dBm) is the cell selection threshold configured on the network and downlink link balance value.

Based on the Table 1, the following values can be calculated according to the following equations.

$$\text{DeltaMaxTxLoss} = \text{MaxTxPwr} - \text{AdjMaxTxPwr} \qquad (1)$$

Where the parameter DeltaMaxTxLoss (dBm) is the Maximum PA TX power delta.

$$\text{DeltaDwnLinkBalErr} = \text{DwnLinkBalSigPwr} - \text{CellSelThresh} \qquad (2)$$

Where the parameter DeltaDwnLinkBalErr (dBm) is the delta between the Cell Selection threshold on the network and the expected downlink link balance value.

$$\text{DwnLinkBalComp} = \text{DeltaMaxTxLoss} + \text{DeltaDwnLinkBalErr} \qquad (3)$$

Where the parameter DwnLinkBalComp (dB) is the total link balance adjustment.

In view of the foregoing, the following exemplary scenarios are considered.

In a first scenario, the LTE wireless communication device 102 has the following values for the entries of Table 1: MaxTxPwr=23 dBm, AdjMaxTxPwr=18 dBm, DwnLinkBalSigPwr=−118 dBm, CellSelThresh=−120 dBm. The resulting adjustments can be calculated as: DeltaMaxTxLoss is equal to 5 dB, DeltaDwnLinkBalErr is equal to 2 dB, and the DwnLinkBalComp is equal to 7 dB.

In a second scenario, the LTE wireless communication device 102 has the following values for the entries of Table 1: MaxTxPwr=23 dBm, AdjMaxTxPwr=18 dBm, DwnLinkBalSigPwr=−118 dBm, CellSelThresh=−114 dBm. The resulting adjustments can be calculated as: DeltaMaxTxLoss is equal to 5 dB, DeltaDwnLinkBalErr is equal to −4 dB, and the DwnLinkBalComp is equal to 1 dB.

In a third scenario, the LTE wireless communication device 102 has the following values for the entries of Table 1: MaxTxPwr=23 dBm, AdjMaxTxPwr=21 dBm, DwnLinkBalSigPwr=−118 dBm, CellSelThresh=−114 dBm. The resulting adjustments can be calculated as: DeltaMaxTxLoss is equal to 2 dB, DeltaDwnLinkBalErr is equal to −4 dB, and the DwnLinkBalComp is equal to −2 dB.

Referring back to FIG. 7, at step 714, the LTE wireless communication device 102 can perform cell selection to attempt to locate a new eNodeB 210 within range. If cell selection is successful, then the LTE wireless communication device 102 can continue to monitor its performance (see step 708). However, if cell selection is unsuccessful, then the wireless communication device 102 can fall back to another technology e.g., 3rd Generation (3G) data services. While 3G services are used in this embodiment, it is appreciated that other technologies are equally viable.

As shown in FIG. 7, once the device has fallen back to 3G services, the wireless communication device 102 remains on 3G only when the performance of the 3G network is acceptable (e.g., as measured by throughput and delay). When the 3G performance is acceptable, then when the wireless communication device 102 triggers a better system reselection (BSR) measurement (and if the LTE performance has not changed for the better), the wireless communication device 102 will remain on the 3G technology rather than selecting LTE. Specifically, even though the LTE network 200 may be available, the wireless communication device 102 will remain on the 3G network to preserve user experience.

However, if the performance of the 3G technology is worse than the current LTE then the wireless communication device 102 will preferentially reselect to a nearby LTE network 200 if available during BSR.

Figure 8:
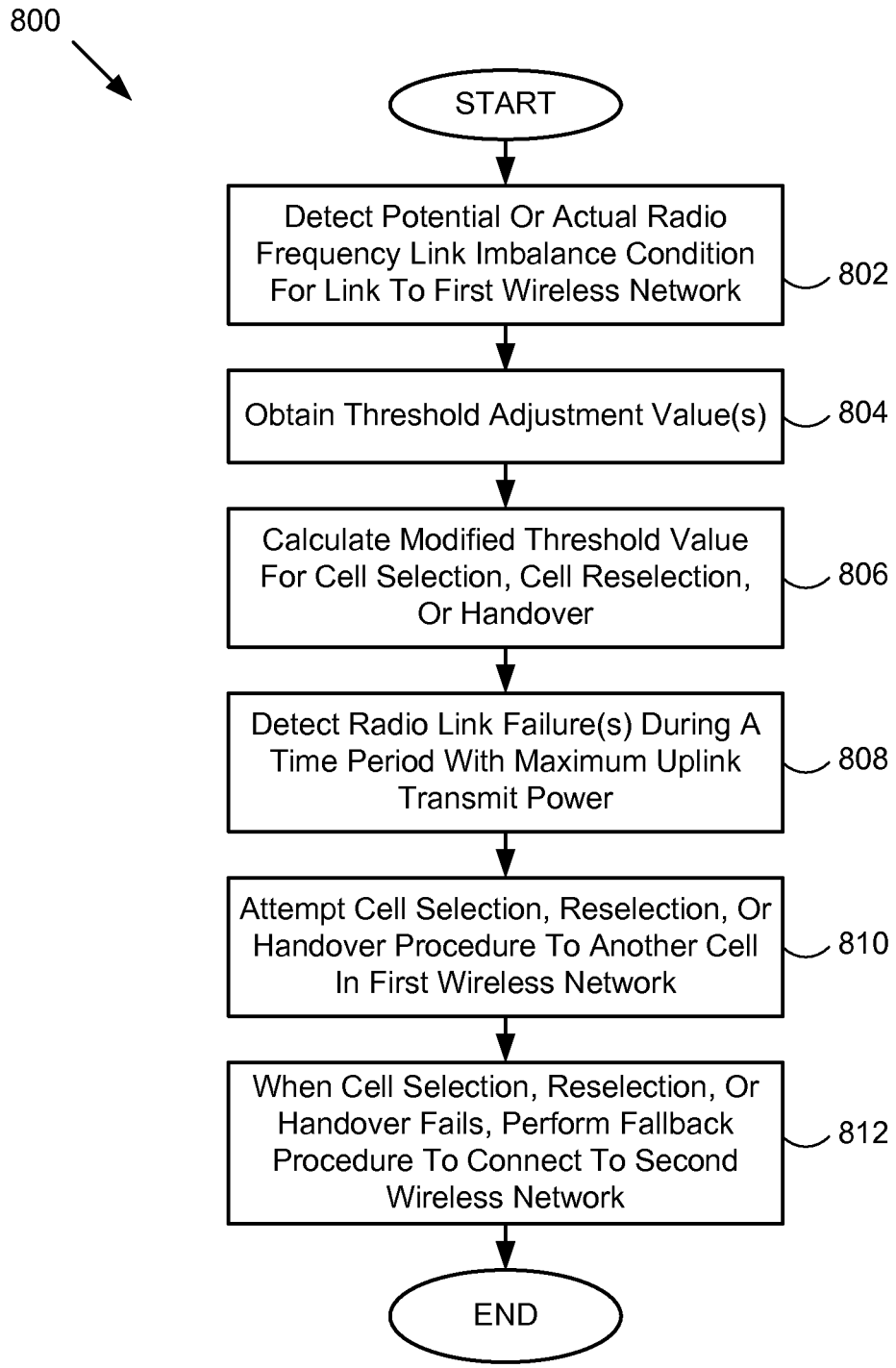
FIG. 8 illustrates a further method for compensating for radio link imbalances in accordance with some embodiments.

FIG. 8 illustrates another method for compensating for radio link imbalances in a wireless communication device 102 connected to a wireless network in accordance with some embodiments. In step 802, the wireless communication device 102 detects a potential or an actual radio frequency link imbalance condition for a bi-directional radio frequency link established between the wireless communication device 102 and the wireless network. Detection of the radio frequency link imbalance condition can include detecting a signal from one or more sensors 302/610 in the wireless communication device 102, the signal indicating an occlusion of wireless radio frequency signals or by receiving an indication of an object in close proximity to the wireless communication device 102, e.g., using a proximity sensor or other sensor as described hereinabove. In some embodiments, the wireless communication device 102 detects the radio frequency link imbalance condition only when the signal is received over a particular time period during which a transmitter in the wireless communication device 102 operates at a maximum transmit power level, e.g., in the uplink direction to the wireless network. In step 804, the mobile wireless device 102 obtains one or more threshold adjustment values associated with the radio frequency link imbalance condition. In some embodiments, particular threshold adjustment values can be associated with one or more aspects of the detected radio frequency link imbalance condition. The threshold adjustment values can be based on an amount of radio frequency link imbalance, e.g., a difference between transmit and receive signal strength values, a difference between an "occluded" receive signal strength and a "non-occluded" receive signal strength. The threshold adjustment values can be based on regulatory requirements for transmit power levels as described above. The threshold adjustment values can be stored in a table of the mobile wireless communication device 102, e.g., as illustrated by Table 1, and/or retrieved from a server in the wireless network. In some embodiments, the wireless network broadcasts information (e.g., parameters in one or more system information blocks) that can affect the threshold adjustment values. In step 806, the mobile wireless communication device can calculate one or more modified threshold values used for determining cell selection, cell reselection, and/or handover. In some embodiments, the modified threshold values can be substituted for default "normal" threshold values used for the same procedures. The modified threshold values can provide for changing when a cell selection, cell reselection, and/or handover occurs, e.g., by changing a signal quality level, signal strength level, or other signal metric used for the procedures to determine whether to switch to another cell or another wireless network. In step 808, the wireless communication device 102 detects one or more radio link failures occurring in a recent time period during which the wireless communication device 102 operates a transmitter at a maximum transmit power level in an uplink direction of the bi-directional radio frequency link. In some embodiments, the wireless communication device 102 detects at least a minimum number of radio link failures based on a quality of service (QoS) requirement. In step 810, when the one or more radio link failures are detected in the recent time period, the wireless communication device 102 can attempt a cell selection, cell reselection, or handover procedure to switch the connection to another cell in the wireless network. The wireless communication device 102 can use the modified threshold values for cell selection, cell reselection, or handover to provide for searching for and/or switching to another cell in the wireless network (or, in some embodiments, to a cell in a different wireless network) at a different receive signal strength, quality, level, or other metric than during "normal" operation. In step 812, the wireless communication device 102 performs a fallback procedure to connect to a second wireless network when cell reselection, reselection, or handover to another cell of the wireless network fails. In some embodiments, the wireless network operates in accordance with a long term evolution (LTE) wireless communication protocol, and the second wireless network operates in accordance with a legacy network wireless communication protocol, e.g., a "3G" wireless communication protocol.

Figure 9:
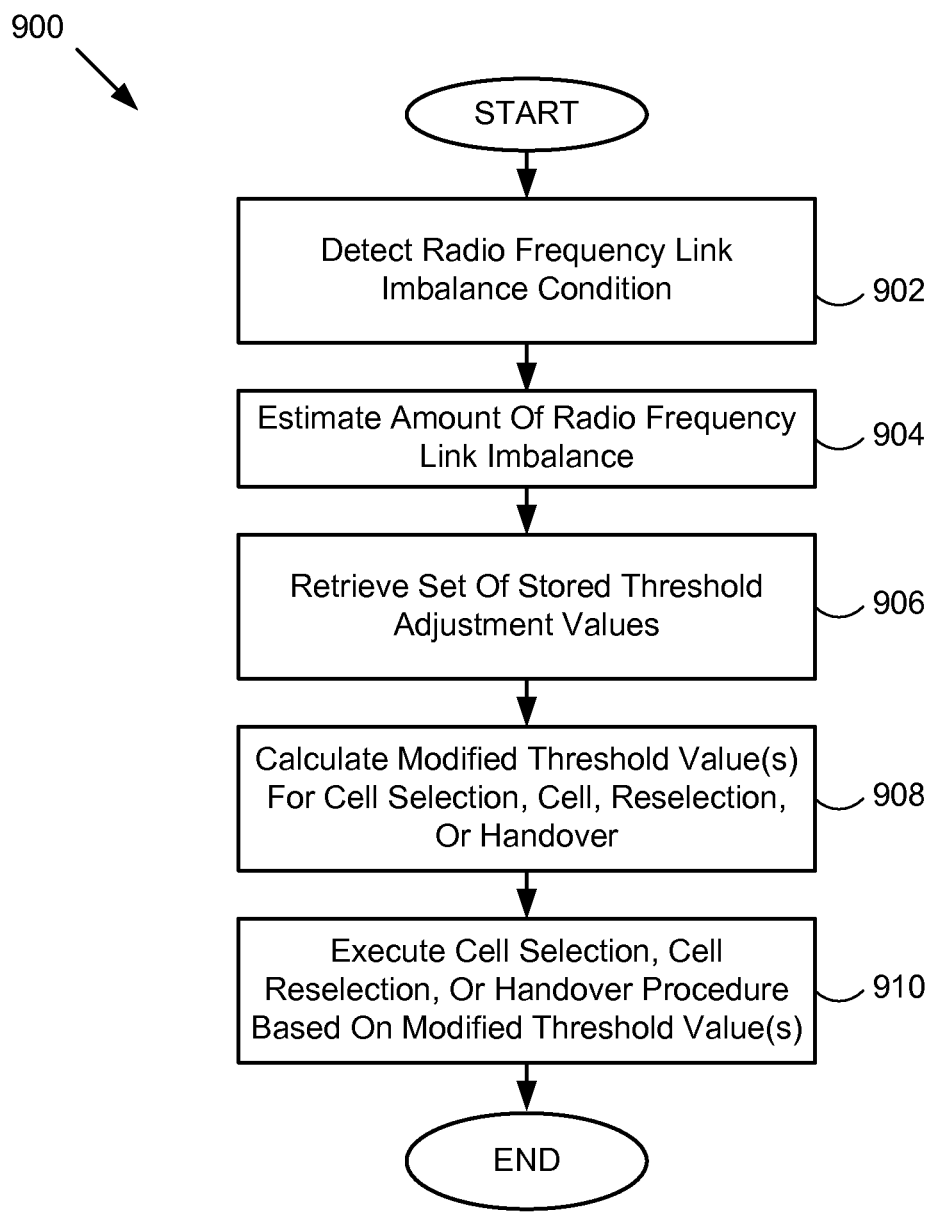
FIG. 9 illustrates an additional method for compensating for radio link imbalances in accordance with some embodiments.

FIG. 9 illustrates an additional method for compensating for radio link imbalances in a wireless communication device 102 connected to a wireless network in accordance with some embodiments. In step 902, the wireless communication device 102 detects a radio frequency link imbalance condition. In step 904, the wireless communication device 102 estimates an amount of radio frequency link imbalance. In some embodiments, the amount of radio frequency link imbalance can be a difference in receive signal strength for two different directions of a bi-directional radio frequency link between the wireless communication device 102 and the wireless network. In some embodiments, the amount of radio frequency link imbalance can be determined based on information provided from the wireless network and/or from another wireless communication device 102 (e.g., a "peer" device). In step 906, the wireless communication device 102 retrieves a set of threshold adjustment values stored in the wireless communication device 102, e.g., in a table as described elsewhere herein. In step 908, the wireless communication device 102 calculates a set of modified threshold values to use for a cell selection, cell reselection, and/or handover procedure based at least in part on the retrieve set of threshold adjustment values. In step 910, the wireless communication device 102 executes a cell selection, cell reselection, or handover procedure using the modified threshold values. In some embodiments, the wireless communication device 102 determines whether to select another cell, reselect to another cell, and/or handover to another cell or to another network based on measurements of signal strength, signal quality, link performance, link data rate, link latency, link delay, or other operating parameters. In some embodiments, the wireless communication device 102 reconnects back to a first cell and/or first wireless network, when the second wireless network to which it reselects and/or performs a handover performs at a lower level than the first wireless network.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

Software, hardware, or a combination of hardware and software can implement various aspects of the described embodiments. The described embodiments can also be a computer program product encoded as computer program code on a non-transitory computer readable medium. The non-transitory computer readable medium is any data storage device that can store data that can thereafter be read by a computer system. Examples of the non-transitory computer readable medium include read-only memory, random-access memory, CD-ROMs, DVDs, magnetic tape and optical data storage devices. The computer program code can also be distributed over network-coupled computer systems so that the computer program code is stored and executed in a distributed fashion.

The various aspects, embodiments, implementations or features of the described embodiments can be used separately or in any combination. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A method to compensate for radio frequency link imbalance at a user equipment (UE) configured to communicate with a wireless network in accordance with a wireless communication protocol, the method comprising:

by the UE, while connected to the wireless network:

detecting a potential or actual radio frequency link imbalance between communication performance in an uplink direction, from the UE to the wireless network, and communication performance in a downlink direction, from the wireless network to the UE, for a bi-directional radio frequency link established between the UE and the wireless network, wherein the detecting is based at least in part on a sensor of the UE indicating an occlusion of transmission of wireless radio frequency signals in the uplink direction;

obtaining a threshold adjustment value associated with the potential or actual radio frequency link imbalance, wherein the threshold adjustment value is based at least in part on a maximum allowable transmit power in the uplink direction for the UE when operating with the occlusion of transmission;

calculating a modified threshold value for cell selection, cell reselection, or handover using the threshold adjustment value;

in response to determining an occurrence of at least one radio link failure (RLF) during a time interval over which the UE transmitted at the maximum allowable transmit power level in the uplink direction, attempting a cell selection, cell reselection, or handover procedure within the wireless network based on the modified threshold value; and when the cell selection, cell reselection, or handover procedure within the wireless network based on the modified threshold value fails, performing a fallback procedure to establish a connection to a second wireless network.

2. The method recited in claim 1, wherein the wireless network operates in accordance with a Long Term Evolution (LTE) wireless communication protocol, and the second wireless network operates in accordance with a third generation (3G) wireless communication protocol.

3. The method recited in claim 1, wherein the sensor of the UE comprises a proximity sensor that indicates an object in close proximity to the UE.

4. The method recited in claim 1, wherein the sensor of the UE indicates the occlusion of transmission occurred during at least a portion of the time interval during which the UE transmitted at the maximum allowable transmit power level in the uplink direction.

5. The method recited in claim 1, wherein the UE determines the occurrence of the at least one RLF during the time interval by at least determining occurrence of a minimum number of radio link failures (RLFs) during the time interval, wherein the minimum number of RLFs is based on a quality of service (QoS) requirement.

6. The method recited in claim 1, wherein obtaining the threshold adjustment value comprises retrieving the threshold adjustment value associated with a radio access technology type of the wireless network from a table stored in the UE, the table including threshold adjustment values for a plurality of wireless radio access technologies.

7. The method recited in claim 6, wherein the threshold adjustment value obtained from the table is associated with a particular radio frequency band used by the wireless network.

8. The method recited in claim 1, further comprising:

after performing the fallback procedure to connect to the second wireless network, determining whether the connection between the UE and the second wireless network satisfies a set of performance criteria based on a throughput value and a delay value for the second wireless network; and when the connection does not satisfy the set of performance criteria, performing a procedure to reconnect the UE to the wireless network.

9. A user equipment (UE) comprising:
one or more processors configured to compensate for radio frequency link imbalance for radio frequency links between the UE and a radio access subsystem of a wireless network; and wireless circuitry configured to transmit signals to and receive signals from the wireless network according to a wireless communication protocol;

wherein the one or more processors are further configured to:
detect a potential or actual radio frequency link imbalance between communication performance in an uplink direction, from the UE to the wireless network, and communication performance in a downlink direction, from the wireless network to the UE, for a bi-directional radio frequency link established between the UE and the wireless network, wherein detection is based at least in part on a sensor of the UE indicating an occlusion of transmission of wireless radio frequency signals in the uplink direction;

biasing a set of one or more operational parameters of the UE based at least in part on a maximum allowable transmit power in the uplink direction for the UE when operating with the occlusion of transmission;

determine whether a trigger condition for performing a remediating action occurs based on the biased set of one or more operational parameters, wherein the trigger condition comprises an occurrence of at least one radio link failure (RLF) during a time interval over which the UE transmitted at the maximum allowable transmit power in the uplink direction; and when the trigger condition occurs, perform the remediating action to compensate for the radio frequency link imbalance.

10. The UE recited in claim 9, wherein the sensor of the UE is configured to detect the occlusion of transmission of wireless radio frequency signals in the uplink direction by detecting a radio frequency occluding object adjacent to the UE.

11. The UE recited in claim 9, wherein biasing the set of one or more operational parameters comprises adjusting trigger event thresholds for cell selection, cell reselection, or handover.

12. The UE recited in claim 11, wherein adjusting the trigger event thresholds comprises:
determining an amount of transmit power reduction required to comply with a specific absorption rate (SAR) regulatory constraint for a region in which the UE operates; and
increasing the trigger event thresholds by the determined amount of transmit power reduction.

13. The UE recited in claim 9, wherein the one or more processors determine whether the trigger condition for performing the remediating action occurs based on the biased set of one or more operational parameters by comparing one or more receive signal metrics to a set of criteria for cell selection, cell reselection, or handover, the set of criteria including at least a portion of the biased set of one or more operational parameters.

14. The UE recited in claim 9, wherein the one or more processors perform the remediating action by performing a cell selection, reselection, or handover procedure to a second radio access subsystem of the wireless network.

15. The UE recited in claim 9, wherein the one or more processors perform the remediating action by performing a inter-radio access technology handover to a third generation (3G) wireless network.

16. The UE recited in claim 9, wherein the one or more processors are further configured to:
when the trigger condition for performing the remediating action does not occur and in response to detecting an end to the potential or actual radio frequency link imbalance for the bi-directional radio frequency communication link, return the set of one or more operational parameters of the user equipment to a set of normal default settings.

17. A computer program product encoded as computer program code in a non-transitory computer readable medium for compensating for radio frequency link imbalances in a user equipment (UE) connected to a wireless network, the computer program product comprising instructions that, when executed by one or more processors of the UE, cause the UE to perform a method comprising:
detecting a potential or actual radio frequency link imbalance between communication performance in an uplink direction, from the UE to the wireless network, and communication performance in a downlink direction, from the wireless network to the UE, wherein detection is based at least in part on a sensor of the UE indicating an occlusion of transmission of wireless radio frequency signals in the uplink direction;

estimating an amount of the potential or actual radio frequency link imbalance based at least in part on a difference between a maximum transmit power in the uplink direction for the UE when operating without the occlusion of transmission and a maximum allowable transmit power in the uplink direction for the UE when operating with the occlusion of transmission;

adjusting a threshold for cell selection, cell reselection, or handover based on the estimated amount of radio frequency link imbalance; and executing a cell selection, cell reselection, or handover procedure based on the adjusted threshold.

18. The method recited in claim 1, wherein the threshold adjustment value is further based at least in part on a difference between a maximum transmit power in the uplink direction for the UE when operating without the occlusion of transmission and the maximum allowable transmit power in the uplink direction for the UE when operating with the occlusion of transmission.

19. The UE recited in claim 11, wherein the UE adjusts the trigger event thresholds based at least in part on a difference between a maximum transmit power in the uplink direction for the UE when operating without the occlusion of transmission and the maximum allowable transmit power in the uplink direction for the UE when operating with the occlusion of transmission.

20. The computer program product of claim 17, wherein the UE executes the cell selection, cell reselection, or handover procedure based on the adjusted threshold in response to determining an occurrence of at least one radio link failure (RLF) during a time interval over which the UE transmitted at the maximum allowable transmit power in the uplink direction for the UE when operating with the occlusion of transmission.

* * * * *